US009724875B2

(12) United States Patent
Kraibühler et al.

(10) Patent No.: US 9,724,875 B2
(45) Date of Patent: Aug. 8, 2017

(54) DEVICE FOR PRODUCING A THREE-DIMENSIONAL OBJECT USING A PRESSURE GENERATING UNIT

(71) Applicant: ARBURG GMBH + CO. KG, Lossburg (DE)

(72) Inventors: Herbert Kraibühler, Lossburg (DE); Eberhard Duffner, Starzach (DE)

(73) Assignee: ARBURG GMBH + CO. KG, Lossburg (DE)

( * ) Notice: Subject to any disclaimer, the term of this patent is extended or adjusted under 35 U.S.C. 154(b) by 0 days.

(21) Appl. No.: 14/360,197

(22) PCT Filed: Nov. 23, 2012

(86) PCT No.: PCT/EP2012/004854
§ 371 (c)(1),
(2) Date: May 22, 2014

(87) PCT Pub. No.: WO2013/075837
PCT Pub. Date: May 30, 2013

(65) Prior Publication Data
US 2014/0284839 A1 Sep. 25, 2014

(30) Foreign Application Priority Data

Nov. 25, 2011 (DE) .......................... 10 2011 119 337

(51) Int. Cl.
*B29C 67/00* (2017.01)
*B33Y 40/00* (2015.01)
(Continued)

(52) U.S. Cl.
CPC .......... *B29C 67/0059* (2013.01); *B29C 43/00* (2013.01); *B33Y 40/00* (2014.12); *B29C 45/50* (2013.01); *B33Y 30/00* (2014.12)

(58) Field of Classification Search
CPC ........ B29C 2045/5028; B29C 67/0051; B29C 67/0059; B29C 43/00; B33Y 30/00
(Continued)

(56) References Cited

U.S. PATENT DOCUMENTS 5,100,271 A * 3/1992 Kameyama et al. ......... 409/231
5,433,594 A * 7/1995 Hehl ......................... 425/192 R
(Continued)

FOREIGN PATENT DOCUMENTS

CA      2754658 A1    9/2010
DE      3229223      4/1983
(Continued)

OTHER PUBLICATIONS

International Search Report for corresponding application PCT/EP2012/004854 filed Nov. 23, 2012; Mail date Mar. 25, 2013.
(Continued)

*Primary Examiner* — Alison L Hindenlang
*Assistant Examiner* — Jerzi H Moreno Hernandez
(74) *Attorney, Agent, or Firm* — Cantor Colburn LLP

(57) ABSTRACT

The invention relates to a device for producing a three-dimensional object (50) from solidifable material in a liquid phase. Said device comprises at least one preparation unit for preparing the solidifiable material in the liquid phase, at least one pressure generating unit (60) for generating a pressure in the liquid phase and at least one discharge unit (12) for discharging the solidifiable material through an outlet opening. Said pressure generation unit comprises a rotation motor and an axial movement motor (10) for moving conveyor means, said rotation motor being arranged behind the axial movement motor (10) when viewed from the discharge unit (12). The invention also relates to a device for providing high forces at low speeds.

10 Claims, 3 Drawing Sheets

(51) Int. Cl.
*B29C 43/00* (2006.01)
*B33Y 30/00* (2015.01)
*B29C 45/50* (2006.01)

(58) Field of Classification Search
USPC .......................................................... 425/375
See application file for complete search history.

(56) References Cited

U.S. PATENT DOCUMENTS

| 5,540,495 | A * | 7/1996 | Pickel ................. B29C 45/5008 366/78 |
| 7,270,532 | B2 | 9/2007 | Presby |
| 2002/0113331 | A1 * | 8/2002 | Zhang ................... B29C 41/003 264/40.1 |
| 2006/0093694 | A1 | 5/2006 | Malwitz |
| 2006/0153946 | A1 * | 7/2006 | Schmidt ........................ 425/582 |
| 2011/0206797 | A1 * | 8/2011 | Taniguchi ..................... 425/587 |
| 2012/0093957 | A1 * | 4/2012 | Hehl et al. .................... 425/170 |
| 2012/0156319 | A1 * | 6/2012 | Hehl et al. .................... 425/135 |

FOREIGN PATENT DOCUMENTS

| DE | 4344335 | 6/1995 |
| DE | 10318958 | 8/2004 |
| DE | 102009030099 | 12/2010 |
| EP | 1886793 | 2/2008 |
| EP | 2266782 | 12/2010 |
| JP | S61266218 A | 11/1986 |
| WO | 2007134961 | 11/2007 |

OTHER PUBLICATIONS

Japanese Office Action for corresponding Japanese Patent Application 2014-542730; Mail date Oct. 4, 2016.

* cited by examiner

DEVICE FOR PRODUCING A THREE-DIMENSIONAL OBJECT USING A PRESSURE GENERATING UNIT

CROSS REFERENCE TO RELATED APPLICATIONS

The present application is filed under 35 U.S.C. 371 as the National Stage of International Patent Application Number PCT/EP2012/004854 which was filed on 23 Nov. 2012 and which claims priority to German Patent Application Number 10 2011 119 337.9, filed on 25 Nov. 2011, the entire content of said applications is herein incorporated by reference.

FIELD OF THE INVENTION

The invention relates to a device for the production of a three-dimensional object using a pressure generating unit.

BACKGROUND

From DE 103 18 958 B3, it is known in the case of a drive means for an injection molding unit in an injection molding machine to attach the axial movement motor directly to the feed screw and to place the dispensing motor that is used for rotating the feed screw behind the axial movement motor as viewed from the plasticizing unit. The connection between a spindle passing thorough the axial movement motor and the rotor of the dispensing motor is effected in mutually non-rotatable manner but it is axially moveable with the aid of multi-tooth couplings (see also WO 2007134961 A1, U.S. Pat. No. 7,270,532 B2, DE 43 44 335 A1). The position of the axial movement motor relative to the dispensing motor does not change when the injection molding unit is in operation.

Furthermore, US 20060093694 A1, which has a comparable construction to DE 103 18 958 B3, comprises a blocking means 29 in the manner of a clutch which permits only unidirectional operation of the axial movement motor upon the occurrence of a certain force.

From EP 1 886 793 A1 or DE 10 2009 030 099 A1, a device is known in which a plasticizing unit that is known in the field of injection molding is coupled to a material storage device that is subjectable to pressure and is used for the production of a fluid phase of a material. The material storage device is a component of a discharge unit for delivering mutually succeeding drops for the purposes of constructing a three-dimensional object on an object carrier without the use of molds. Due to the adhesive forces of the material, a high pressure and usually also high temperatures are necessary for this purpose. At the same time, the thus produced parts, for production quantities in single and small batches such as samples for example, have to be precisely manufactured from very viscous fluid materials such as molten synthetic material in the smallest of quantities in discrete individual portions of down to just a few micrograms, so that the material has to be conveyed at very low speeds.

For producing the drops, 50 to 100 MPa (500 to 1000 bar) are present at the outlet opening of the discharge unit. Amongst other things, this is because of the so-called laminar source-flow which the material exhibits in the fluid phase. Contributing to the source-flow amongst other things is the accumulation of the melt on the wall. This can be seen most clearly by considering the knowledge gained from the field of injection molding. During the mold-filling process of a simple rectangular channel, the melt is injected via a so-called sprue point and begins to spread out from this point in a circular manner having closed flow fronts until it fills the entire width of the cavity. Some time thereafter, the region between the intake and the flow front can be regarded as almost formed. At the flow front itself however, a special flow situation prevails, the "source-flow", since the flow lines in this region appear to be like a source, if one regards them with respect to a concurrently moving coordinate system.

The laminar source-flow is of advantage for the production of drops 'aligned' on the object that is to be manufactured due to its laminar formation on the one hand, but on the other hand, it is precisely here where the problems aggravating the adaptation of the devices and materials known from the field of injection molding arise, above all, in the formation of small drops. The wall adhesion leads to the fact that the masses can only be formed into drops having the desired small volumes, preferably in a range of less than or equal to 1 $mm^3$ with great difficulty, whereas it is a correspondingly high viscosity of the material that is of prime importance for the formation of a suitable drop-shape of a drop.

This also differentiates the materials being used from the previously known waxes. Due to their viscosity, waxes can be expelled in normal thermoprinting or inkjet processes, i.e. by a purely kinematic, pressure-free acceleration process without a pressure difference of the melted drop. The materials used here differ from them because their coefficient of viscosity is higher by several orders of magnitude. Thus, the dynamic coefficient of viscosity of the solidifiable material lies between 100 and 10000 [Pa s], where the solidifiable material is preferably a synthetic material that is common in the field of injection molding or a resin. This makes it necessary for the fabrication process to make use of a pressurizable material storage device and hence too, a special pressure generating unit, since pressures of more than 50 to 100 MPa (500 to 1000 bar) are definitely required, especially when small discharge openings are used for producing drops having a small volume.

Preferably, the desired volume of the drop lies especially in a range of 0.01 to 1 $mm^3$. The diameter of the outlet opening preferably amounts to about 0.1 mm. In the case of a quite normal injection speed of 100 [cms] which advances the mass through a so-called point gating of 0.1 [mm] diameter, there then results a value of 10,000 [ms] for the through surface flow rate. For the fluid phase, this leads to a laminar flow-source with flow velocities of up to 10,000 ms.

Comparable processes, which are commonly known by the expression prototyping and rapid manufacturing and are intended for the production of sample parts with the requirement for a very brief preparatory time, do not have this problem. The production of such parts is based on a mold-less process, i.e. without forming molds, namely, in most cases too, in the production of the geometry from 3D data, although these geometries are produced by appropriate means such as melting powder layers by the application of heat, e.g. by means of a laser, generative systems such as printing processes in differently linked forms of the powder particles or else by means of a so-called fusion stranding process. The precision of these processes is not affected at all by the pressure in the system or only to a small extent in the fusion stranding process, but a discontinuous production of the three-dimensional object does not take place there.

BRIEF SUMMARY

On the basis of this state of the art, the invention provides a device for the provision of high forces at low speeds.

To this end, the device comprises the preparation unit for providing and if necessary preparing the solidifiable material and the pressure generating unit, wherein drops are delivered via a discharge unit. The pressure generating unit comprises a rotation motor and an axial movement motor for moving a conveying means, wherein, as seen from the discharge unit, the rotation motor is arranged behind the axial movement motor which applies the pressures and so to that extent is arranged to be closer to the plasticizing unit and the material storage device than the rotation motor. Consequently, the axial movement motor when firmly mounted can be of greater size whilst at the same time quasi carrying on its back the rotation motor which is less loaded by the very low speeds compared with those in the field of injection molding. Thus, on the one hand, the pressure generating unit can constantly produce the pressure by the forward movement of a conveying means that is preferably in the form of a feed screw, whilst preparing the synthetic material for the melting process by rotation of the feed screw on the other. The rotor of the dispensing motor is connected rigidly to the spindle of the injection motor which is in turn connected to the feed screw in releasable manner. This spindle is coupled to the rotor of the axial movement motor within the axial movement motor. In order to couple the necessary cyclical movements of the feed screw and the rotational movement of the dispensing motor to one another, the dispensing motor which is mounted such as to be axially moveable relative to the axial movement motor is blockable in one direction of rotation by a free-wheel device. This results in a compact system so that the effects of the high pressures are small even in the system itself. Consequently, the usual and thus favorable materials utilized in the field of injection molding can be used since no special prototyping materials are necessary.

Preferably, the pressure generating unit consists of an axial movement motor which is in the form of a hollow shaft motor having a threaded spindle located therein, the feed screw being axially moved by the motor. The rotation of the feed screw is effected by a separate dispensing motor which provides the plastified material in cooperation with the axial movement motor and the dynamic pressure regulating system. The feed screw movement takes place exclusively within the system, thereby assisting the process of delivering precise drops and thus readily reproducible highly accurate components.

Further advantages are apparent from the appendant Claims and the following description of an exemplary embodiment.

BRIEF DESCRIPTION OF THE FIGURES

The invention is explained in greater detail hereinafter with the aid of an exemplary embodiment. Therein.

DETAILED DESCRIPTION

Figure 1:
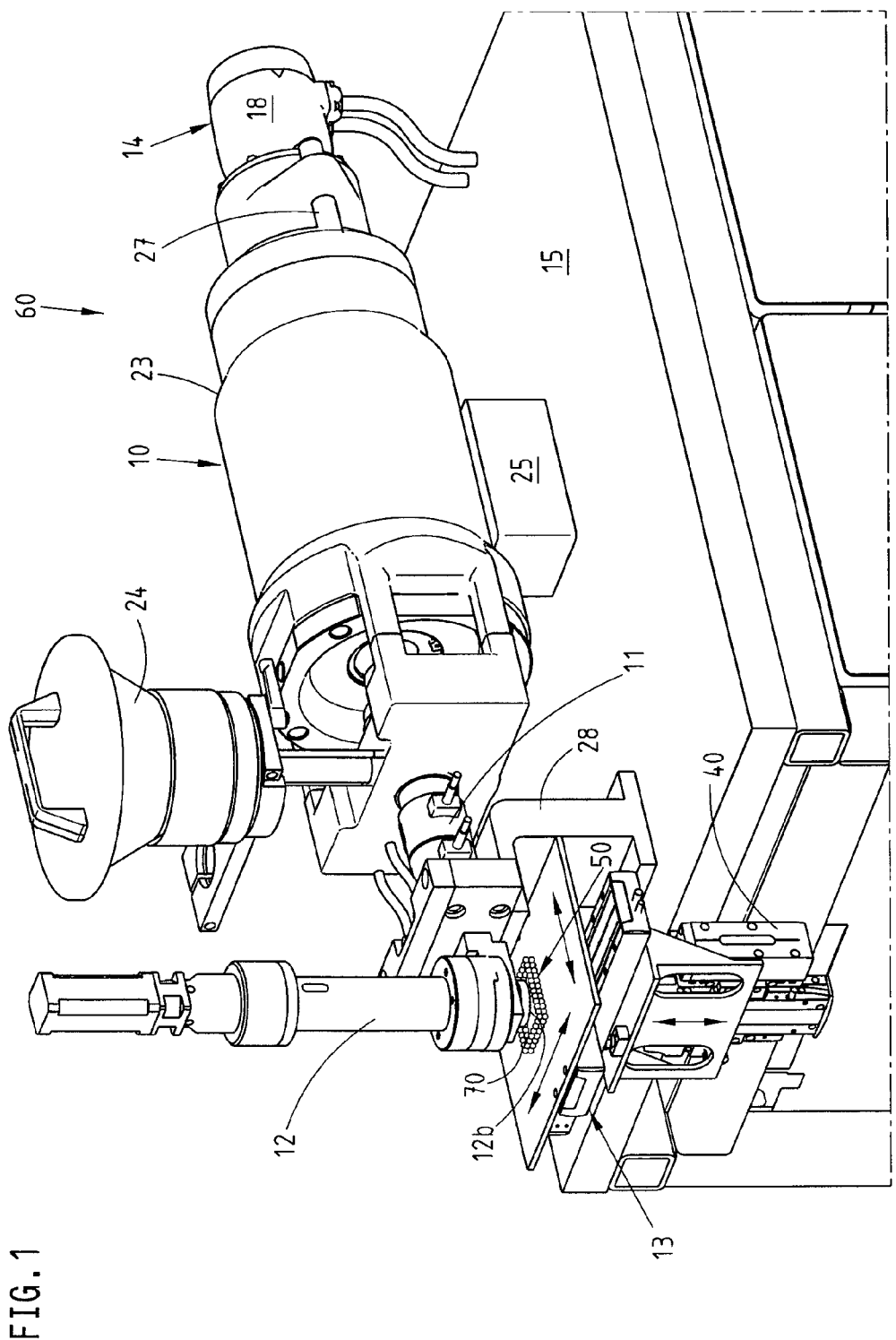
FIG. 1 shows a device for the production of a three-dimensional object in a three-dimensional view, FIG. 2 a longitudinal section through the pressure generating unit, FIG. 3 a longitudinal section through the pressure generating unit and the plasticizing unit.

The invention is now described exemplarily in more detail with reference to the accompanying drawings. However, the exemplary embodiments are concerned only with examples which are not intended to limit the inventive concept to a certain arrangement. Before the invention is described in detail, it should be pointed out that it is not limited to the particular components of the device or the particular processing steps, since these components and processes can vary. The expressions used herein are only intended to describe special embodiments and are not used restrictively. In addition, if the singular or indefinite articles are used in the description or in the Claims, then this also includes a plurality of these elements, insofar as the general context does not make something else clear.

The Figures show a device for the production of a three-dimensional object 50 consisting of solidifiable material which, in the starting state, is present in either a fluid phase or being such that it can be liquefied. The production of the object is preferably effected by means of the sequential delivery of drops 70. To this end for example, individual drops 70 can be delivered sequentially from an outlet opening 12b of a discharge unit 12 so that the object 50 is built up layer by layer on an object carrier 13 which is moveable in the coordinate directions of the area. The object carrier 13 is guided in moveable manner relative to the outlet opening 12b of the discharge unit on a mounting 40.

The solidifiable material is a plastified material, e.g. silicone or a plastifiable material such as plastics or else materials in powdered form, wherein it depends in essence, on the solidifiable material being present in the starting state either in a fluid phase or being such that it can be liquefied. The material could also be a material which is reversibly meltable when heated and is thus recyclable. Any other desired materials can also be used insofar as these materials are plastifiable by the device and above all, in that they are capable of being discharged by at least one discharge unit 12. Above all however, materials can also be processed by the device such as those which are usually employed in the field of injection molding in large quantities, this thereby contributing to the satisfactory production of the articles that are to be manufactured thereby.

The device comprises at least one preparation unit for the preparation of the solidifiable material into the fluid phase and for the supply thereof—especially if the material is already present as a liquid, and possibly too if it is to be kept in this state—, and which, in the exemplary embodiment, is formed by a plasticizing unit 11 known in the field of injection molding. In the exemplary embodiment, this plasticizing unit is directly coupled to a material storage device 12c in the discharge unit 12 which can be subjected to pressure and which, in accord with FIG. 3, could merely be in the form of a channel. If necessary, an indirect coupling is also possible as long as care is taken to ensure that the high pressures are controlled in an appropriate manner. The discharge unit 12 serves for delivering the solidifiable material through a preferably clockable outlet opening 12b in the direction of the three-dimensional object 50 that is to be manufactured or the associated object carrier 13.

At least one pressure generating unit 60 produces the pressure on the fluid phase in the material storage device 12c, this pressure being necessary particularly in the case where the material is delivered in drop-like manner so that the corresponding drops, or rather, properly speaking, droplets, can be formed. Basically however, the device is suitable for delivering the material with great force at very low speeds. The discharge unit 12 and the pressure generating unit 60 are preferably connected together by the plasticizing unit 11. They form a system in which, or within which, the pressure is brought to bear on the fluid phase. Discharge unit 12 and mounting 40 are fixed to one another. The pressure generating unit 60 is attached to the discharge unit 12 and is moveably mounted in relation to this connection. Thus, the larger unit for reason of size, namely, the pressure generating unit 60 is mounted such as to be moveable relative to the smaller, correspondingly rigid unit consisting of the discharge unit 12 and the mounting 40 for the object carrier 13. Consequently, despite the high pressures and possibly high temperatures, precision within the region where the drops 70 are delivered is ensured.

Preferably, discharge unit 12 and mounting 40 are fixed onto a machine table 15 which is preferably of stiff construction in order to also keep the movements here as small as possible. In accordance with FIGS. 1 and 3, the axial movement motor 10 of the pressure generating unit is preferably moveable over the support 25 on the machine table 15, namely, it is supported such as to be moveable axially along the machine table, whilst the discharge unit 12 is supported on the machine table 15 by the support 28. In turn, the mounting 40 for the coordinate table of the object carrier 13 is then securely fixed to the machine table 15 so as to produce a rigid connection between the mounting 40 and the discharge unit 12 via the machine table 15.

The pressure generating unit 60 comprises a rotation motor, the electromechanical dispensing motor 14, and an axial movement motor 10 for moving a conveying means, wherein the conveying means is preferably a feed screw 26 which is accommodated in the plasticizing unit 11. In accordance with FIG. 3, the dispensing motor 14 is arranged behind the axial movement motor 10 as seen from the discharge unit 12. This arrangement was chosen because of the high forces that have to be applied by the axial movement motor, these forces regularly lying within a range of between 50 and 100 MPa. Due to the selected arrangement, these forces can be applied to the discharge unit 12 or the material storage device 12c located therein via the shortest path. The pressure generating unit 60 is effective to produce a constant pressure by the forward movement of the conveying means or the feed screw 26, respectively, on the one hand, whilst on the other hand, the synthetic material is prepared as required as a melt due to the cooperation between the feed screw 26 and the plasticizing unit 11 produced by the rotation of the feed screw in the plasticizing unit.

The axial movement of the feed screw 26 is produced by the axial movement motor which comprises a stator 20 and a hollow rotor 21 for driving a spindle 16 which passes through the rotor. The spindle 16 of the spindle drive device is operatively connected to a nut. The rotation of the feed screw 26 is effected by a separate drive motor 18 of the dispensing motor 14 which is employed simultaneously with the axial movement motor and the system for regulating the dynamic pressure used for the purposes of producing the object. The axes of the drive motor 18 of the dispensing motor 14 and the axial movement motor 10 are aligned with one another.

The spindle 16 of the axial movement motor 10 is fixedly connected to a rotor 22 of the drive motor 18 and is releasably connected to the conveying means or the feed screw 26. In order to ensure the mutually independent operation of the two motors, the dispensing motor 14 is in this respect blockable in one direction of rotation by a free-wheel device 19 mounted in a housing 18a of the drive motor 18. For the purposes of countering the torque of the free-wheel device, the housing 18a of the drive motor 18 is mounted via a torque support 27 on the housing 23 or the housing casing 23a of the axial movement motor 10.

Figure 2:
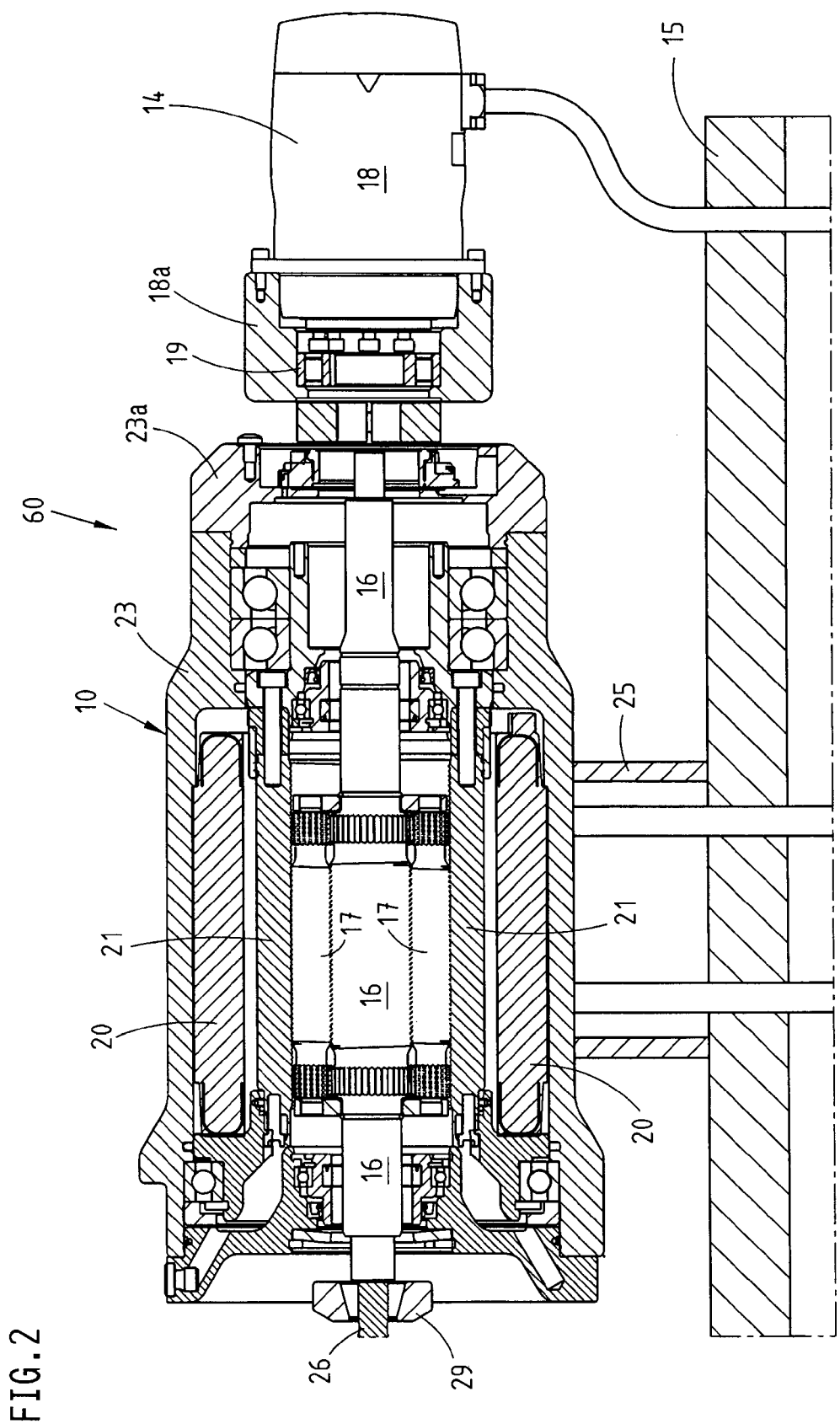

The axial movement motor 10 is formed by a hollow shaft motor through which the spindle 16 passes. The nut of the spindle drive of the axial movement motor 10 is mounted in the rotor 21 of the axial movement motor or is formed by the rotor 21 as in the embodiment in accordance with FIG. 2. In addition, the rotor 21 and the spindle 16 are operatively coupled to one another by planetary gears 17 in the exemplary embodiment.

Figure 3:
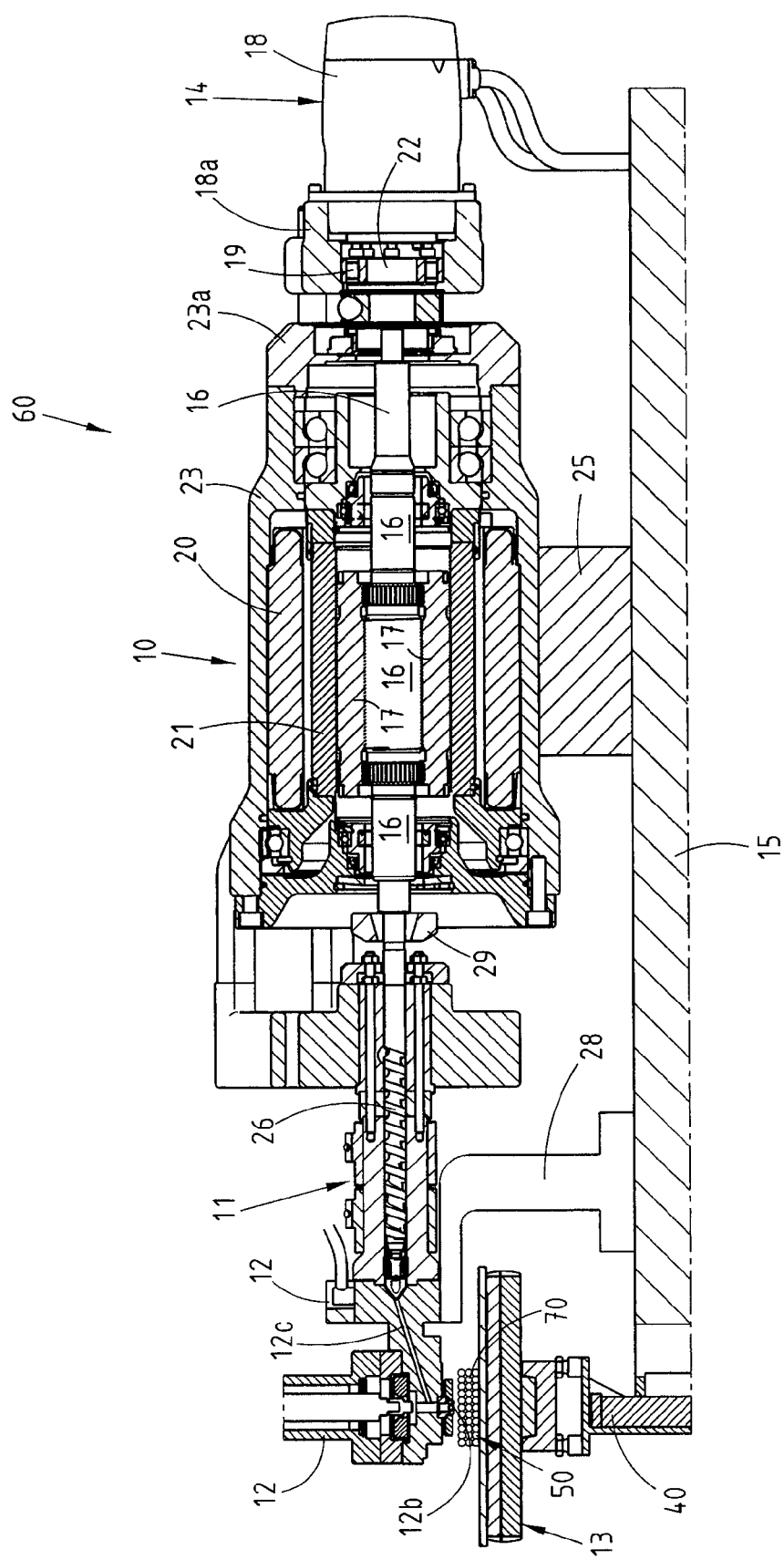

In accordance with FIG. 3, the feed screw 26 is fixed to the front end of the spindle 16 in releasable manner via a feed screw coupling 29, i.e. on the left-hand side of the axial movement motor in FIG. 3.

When generating pressure and supplying the plastifiable material, the device works as follows:

In the exemplary embodiment, the axial movement of the feed screw 26 is produced in accord with FIG. 3 by the spindle 16 of the axial movement motor 10 with the aid of the rotationally driven rotor 21 which simultaneously forms the nut of the spindle drive. The transmission from the rotor 21 to the spindle 16 is effected via the intermediary of the planetary gears 17. The spindle can only produce an axial force when it is experiencing a torque counter-acting force corresponding to its spindle ratio. This torque counter-acting force is developed by the dispensing motor 14 in the main direction of the force, i.e. to the left in FIG. 3 during the movement of the feed screw 26, the dispensing motor being supported by means of a torque support 27 on the housing 23 for the axial movement motor 10. The torque support 27 forms guide means along which the dispensing motor 14 is mounted in axially moveable manner during the movement of the conveying means. For the backward movement of the feed screw, the torque counter-acting force is made available by an appropriately regulated active energizing with current. Basically, due to the fixed connection of the spindle 16 of the axial movement motor 10 to the rotor 22 of the drive motor 18, the rotary movement of the dispensing motor also leads to a rotary movement of the spindle 16 and vice versa. The spindle 16 can convert the rotation into a linear movement if a torque support corresponding to the desired feeding force is provided in correspondence with the spindle pitch thereof. For this torque supporting process, a free-wheel device 19 is integrated into the drive motor 18 of the dispensing motor 14 for building up the pressure, i.e. for the movement of the feed screw 26 to the left in FIG. 3, whilst the dispensing motor 14 is active for the reverse direction of the feed screw 26.

The free-wheel device is provided in order to decouple the movement of the axial movement motor from the dispensing motor 14 and it blocks or can block the dispensing motor 14 in one direction of rotation, i.e. a unidirectional rotation prevention means. The free-wheel device 19 is mounted on the housing 18a of the drive motor 18 of the dispensing motor 14. For its part, this mounting is in turn mounted via the torque support 27 on the housing 23 or the housing casing 23a of the axial movement motor 10.

It is self-evident that this description can be subjected to the most diverse modifications, changes and adaptations which fall within the range of equivalents to the attaching Claims.

The invention claimed is:

1. A device for the production of a three-dimensional object from solidifiable material which is either present in fluid form in the starting state or can be liquefied, comprising at least one preparation unit for the provision of the solidifiable material in a fluid phase,
　　at least one discharge unit for delivering the solidifiable material through an outlet opening,
　　at least one pressure generating unit for generating a pressure on the fluid phase, wherein the pressure generating unit comprises a rotation motor incorporating a rotor and an axial movement motor for axially moving a spindle and a conveying means, wherein the rotation motor is arranged behind the axial movement motor as seen from the discharge unit, wherein the spindle passes through the axial movement motor and is fixedly connected to the rotor of the rotation motor in mutually non-rotatable manner at one end, so that a rotary movement of the rotor also leads to a rotary movement of the spindle and vice versa, and is connected in releasable manner to the conveying means at the other end, wherein axes of the rotation motor and of the axial movement motor are mutually aligned, wherein the rotation motor is blockable in one direction of rotation by a free-wheel device mounted in a housing of the rotation motor, wherein the axial movement motor carries on its back the separate rotation motor.

2. A device in accordance with claim 1, wherein the rotation motor is an electromechanical dispensing motor for the rotation of the conveying means which is in the form of a feed screw, and wherein the electromechanical axial movement motor is an electromechanical axial movement motor for the axial movement of the feed screw and comprises a stator and a hollow rotor for driving the spindle of a spindle drive and a nut cooperating therewith which spindle passes through the rotor.

3. A device in accordance with claim 1, further comprising at least one material storage device for the fluid phase which is connected to the pressure generating unit for generating the pressure on the fluid phase in the material storage device.

4. A device in accordance with claim 1, wherein the discharge unit for a sequential discharge of the solidifiable material in the form of drops comprises an outlet opening in direction of the three-dimensional object to be manufactured.

5. A device in accordance with claim 3, wherein the preparation unit is a plasticizing unit for preparing the solidifiable material into plastified or plastifiable material, which plasticizing unit is directly coupled to the material storage device that is subjectable to the pressure.

6. A device in accordance with claim 1, wherein the housing of the rotation motor in the form of a dispensing motor is mounted on a housing of the axial movement motor for the purposes of countering a torque of the free-wheel device.

7. A device in accordance with claim 1, wherein the rotation motor is mounted in axially moveable manner on guides which form a torque support and are fixed to a housing of the axial movement motor.

8. A device in accordance with claim 1, wherein the axial movement motor is a hollow shaft motor through which the spindle passes.

9. A device in accordance with claim 2, wherein the nut of the spindle drive of the axial movement motor is mounted in the rotor of the axial movement motor or is formed by the rotor of the axial movement motor.

10. A device in accordance with claim 1, wherein a planetary gear drive is accommodated in the axial movement motor.

* * * * *